Jan. 22, 1935.  C. BLASCHKE  1,988,618

PLANTER

Filed July 13, 1933  3 Sheets-Sheet 1

Inventor
C. Blaschke,
By L. F. Randolph Jr.
Attorney

Jan. 22, 1935.  C. BLASCHKE  1,988,618
PLANTER
Filed July 13, 1933  3 Sheets-Sheet 2
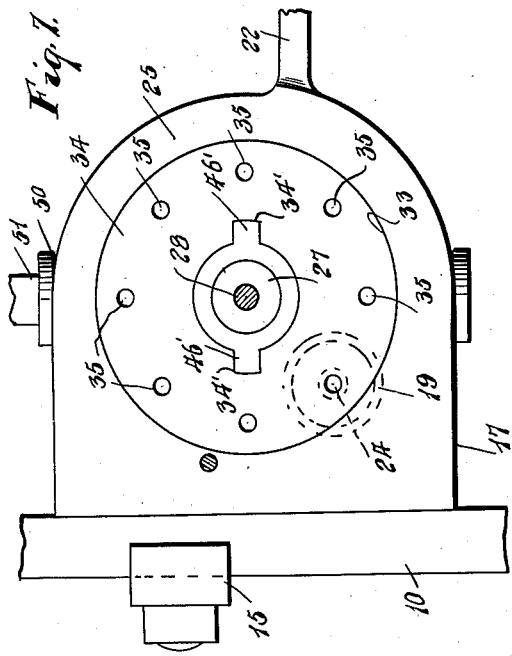
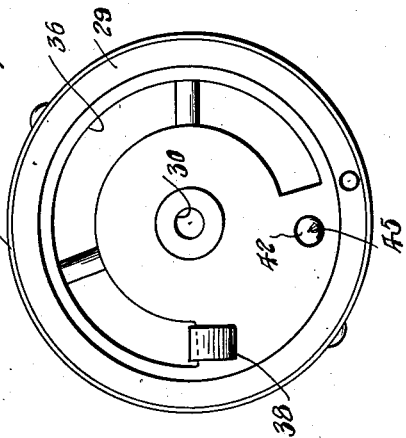
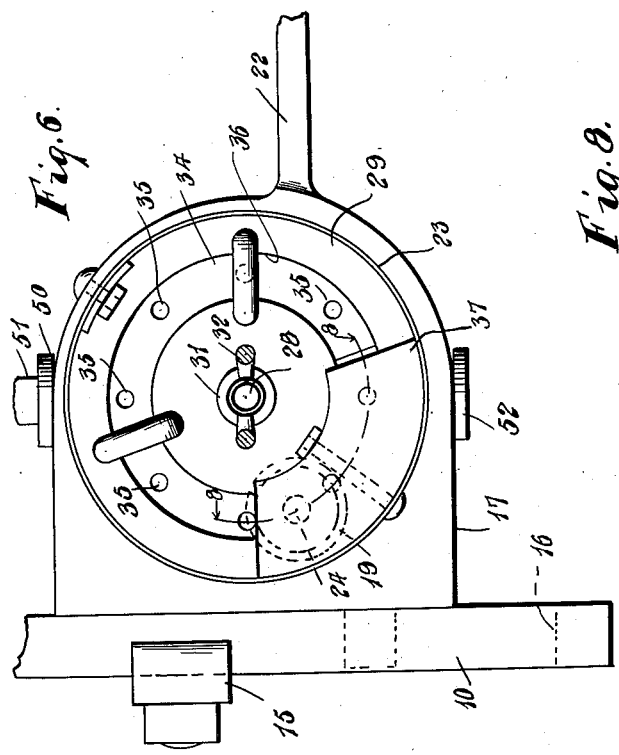
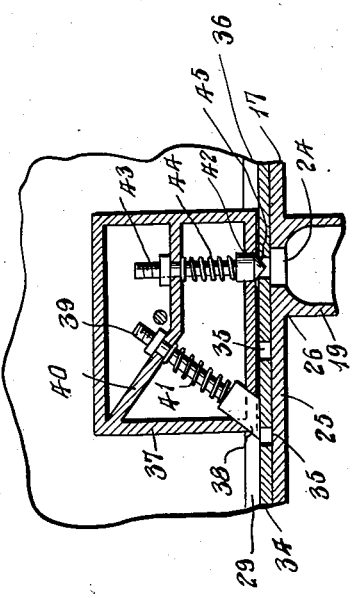
Inventor
C. Blaschke
By L. F. Rudolph Jr.
Attorney Jan. 22, 1935.  C. BLASCHKE  1,988,618
PLANTER
Filed July 13, 1933   3 Sheets-Sheet 3

Inventor
C. Blaschke
By L. F. Landrush Jr.
Attorney

Patented Jan. 22, 1935

1,988,618

UNITED STATES PATENT OFFICE 1,988,618

PLANTER

Charles Blaschke, Schulenburg, Tex.

Application July 13, 1933, Serial No. 680,318

3 Claims. (Cl. 111—52)

This invention relates to a planter primarily adapted for use as an attachment and to plant in two rows at the same time at varying distances apart, usually from fourteen to twenty-six inches apart.

The machine is adapted to plant onion seeds for example, it also being adapted for the planting of various other seeds.

More specifically it is aimed to provide a construction having a shaft adapted to be driven from a wheel or the equivalent of the planter and to operate one or more seed boxes having novel discharge means therein.

The more specific objects and advantages will become apparent from a consideration of the description following taken in connection with accompanying drawings illustrating an operative embodiment.

In said drawings:—

Figure 1:
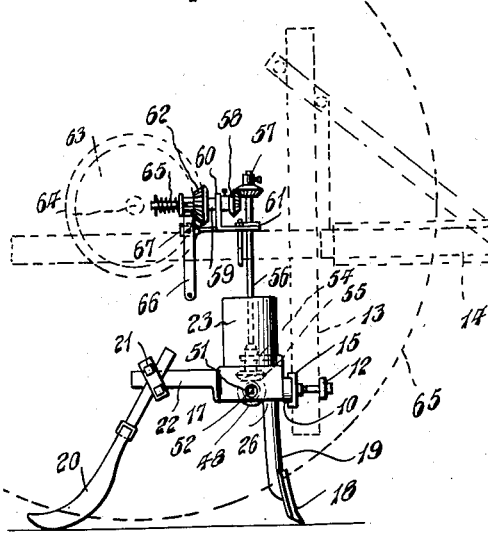
Figure 2:
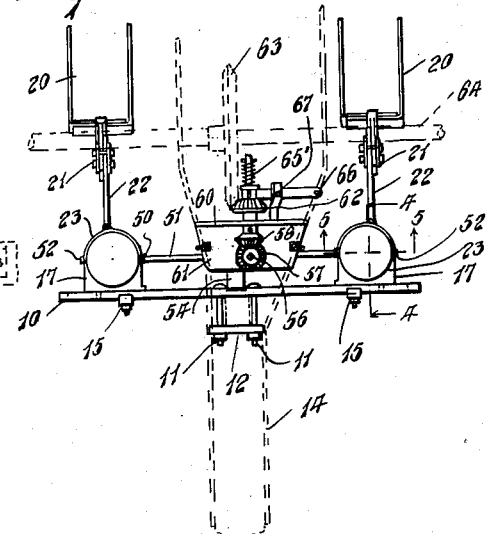
Figure 10:
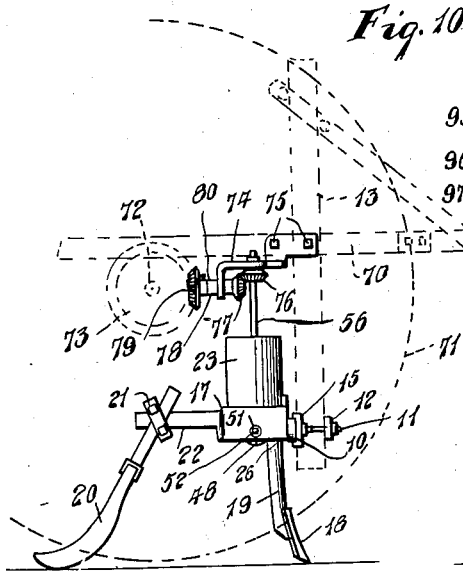
Figure 11:
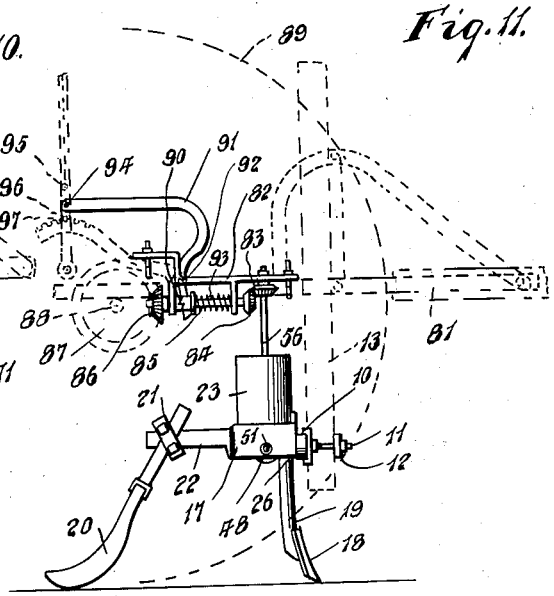
Figure 3:
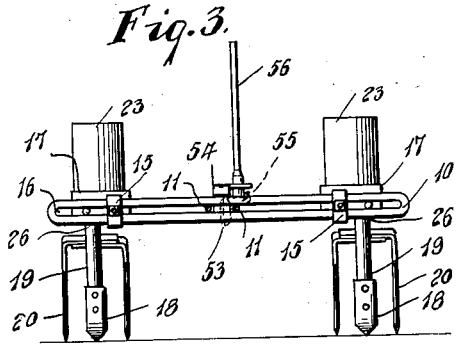
Figure 5:
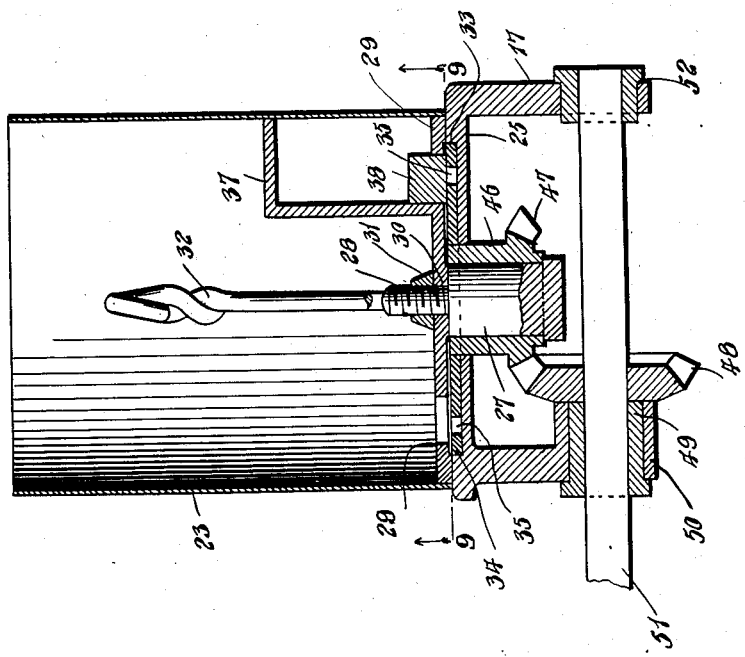
Figure 4:
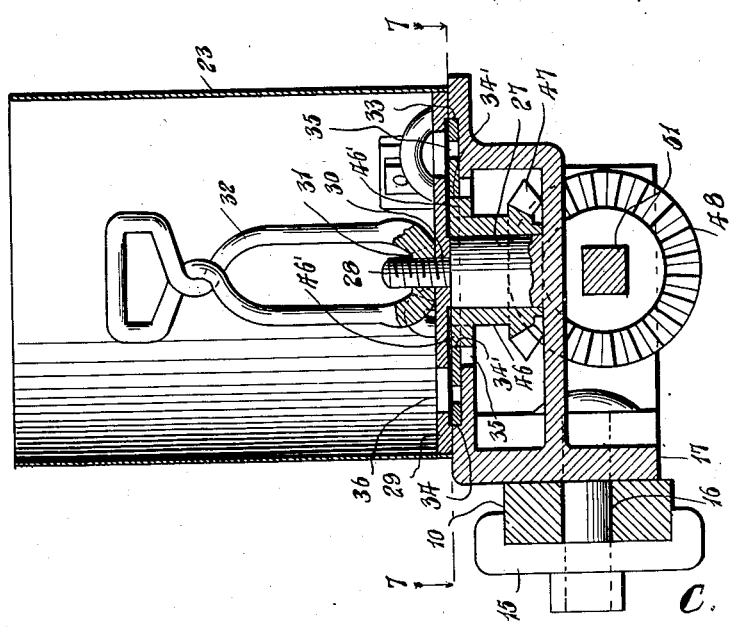

Figure 1 is a side elevation of the attachment, in connection with portions of one form of planter with which it may be used, Figure 2 is a plan view of the parts of Figure 1, Figure 3 is a rear elevation of the attachment alone, Figure 4 is an enlarged vertical sectional view taken on the line 4—4 of Figure 2, Figure 5 is an enlarged sectional view taken on the line 5—5 of Figure 2, Figure 6 is an enlarged plan view particularly showing one of the seed hoppers and associated mechanism, Figure 7 is a cross sectional view taken on the line 7—7 of Figure 4, Figure 8 is a cross sectional view taken on the line 8—8 of Figure 6, Figure 9 is a cross sectional view taken on the line 9—9 of Figure 5, Figure 10 is a side elevation showing the attachment connected to a different form of planter and using a different drive means from Figure 1, and Figure 11 is a side elevation showing the attachment using a still further form of driving means and connected to a different form of planter.

Referring specifically to the drawings and first to the form shown in Figures 1 to 9, the device comprising my invention consists of a bar or frame 10 adapted to be disposed horizontally and by means of bolts 11 and a clamping plate 12 be connected to a member 13 of a frame 14, fragmentarily shown, of a riding planter. The attachment and drive for the device are capable of being varied to suit any construction of riding planter.

Suitably adjustable along the bar or frame 10, as by means of clamp 15 having bolts slidable in an elongated slot 16 of said bar or frame 10, are brackets 17 of hollow form, at the front of which is a furrow opening shovel 18 attached to a dependent tube 19 integral with such brackets 17, and furrow-covering tools, operating after the seed is discharged, are shown at 20, being secured by clamps 21 to rearwardly extending arms 22 integral with the brackets 17. The covering tools 20 are bifurcated as best shown in Figure 2.

Containers or hoppers 23 for onion seeds or other seeds are detachably secured to the brackets and rest on the upper surfaces thereof, the seed discharging finally through an opening 24 in the top plate 25 of each bracket 17. Guide tubes for the seed may depend at 26 from said plates 25 in order to lead and discharge the seed in the furrows opened by the tool 18 between the tools 18 and 20, and closed by the tools 20.

Integral or otherwise rigid on the brackets 17 are studs 27 from which rise integrally screw members 28. The bottom walls 29 of hoppers 23 have openings 30 therethrough whereby the screws 28 project through the openings, and above the base 29 to receive fastening nuts 31. Such nuts 31 are preferably integral parts of spiders 32 which prevent undue packing of the seed, which spiders also serve as handles in connection with the loosening and tightening of the nuts 31. Said hoppers and their bases 29 and brackets 17 are relatively stationary in use.

The upper surfaces of the walls 25 of the brackets are recessed at 33 and rotatable in such recesses are distributor plates 34, having a plurality of equidistantly spaced openings 35 therethrough to receive seeds from the hopper through an arcuate opening 36 in such bottoms or bases 29, arched elements 36' bridging said openings.

A housing 37, closed against the entrance of seed is provided within the hopper and it has a guard 38 of plunger form slidably mounted therein by means of a shank 39 passing through an opening in a partition 40 and spring pressed at 41 in a downward direction. The guard extends outside of the housing 37 and is adapted for contact with the rotatable plate 34 over the openings 35 therethrough, to prevent surplus seed remaining in the opening and being crushed between the plates 34 and the bottom of the housing 37. Also within said housing is an ejector 42 also in the form of a spring pressed plunger since it has a shank 43 slidably passing through an opening in the partition 40 and urged downwardly by a spring 44. The plunger 42 is adapted to move into and out of the openings 35, as they register therewith to insure ejection of the seeds through opening 24 into the tube 26, the movement of the plunger out of the opening being automatic since the lower surface of the plunger is conical as at 45.

Adapted to drive the plates 34 are sleeves 46 equipped with bevel gears 47, such sleeves and gears being journaled on the studs 27. Sleeves 46 extend through plates 34 and have projections 46' entered in slots 34' of said plates detachably coupling them together. The gears 47 mesh with bevel gears 48 having sleeves 49 journaled in bearings 50 of the brackets 17. A shaft 51, preferably square or otherwise polygonal in cross section passes through a corresponding opening in the gear 48 and sleeve 49 and bearings 52 journaled and secured in the brackets 17. The square shaft enables the gears 48 and sleeves 49 and bearings 52 to be moved with the brackets and hoppers as units along the shaft 51 according to the width desired for the rows.

Said shaft 51 may be rotated in any suitable manner. Preferably it has a bevel gear wheel 53 keyed thereon adjacent which a bracket 54 is rigidly connected to the bar or frame 10. In such bracket 54, a bevel gear wheel 55 is journaled which is enmeshed with the gear wheel 53 and in turn is rigid with a vertical drive shaft 56.

Said shaft 56 has a bevel gear wheel 57 keyed thereto and enmeshed with a gear wheel 58 keyed to a shaft 59 journaled in a bracket 60, suitably secured to the frame 14. Said bracket 60 has a bearing 61 through which the shaft 56 passes. Shaft 59 has a bevel gear wheel 62 thereon which is enmeshed with a gear wheel 63 keyed to the axle 64 of the planter, one ground wheel of the latter being shown at 65. The drive from the wheel 63 to the gear 62 is under control of a spring-controlled clutch 65' adapted to be thrown in or out to establish or destroy the driving of the gear 62 and the attachment, through the operation of a lever 66 pivoted at 67 to the bracket 60. Said lever 66 is preferably connected pivotally to the main lifting lever on the riding planter 14 so that lifting operation of said lever will open the clutch and lowering movement of such lever will permit the clutch to engage or close.

In operation, it will be clear that the seed in the hoppers 23 will be prevented from packing and their discharge aided by the spiders 32, passing through the openings 36 and gathered in the openings 35. The guard 38 by engaging the upper surface of the rotatable distributing plates 34, prevents the seeds from wedging under the housing 37 and the ejector 42 aids in displacing them through the port 24 and tubes 26, it being clear that as the machine travels over the ground, the wheel 65 turns the axle 64 and the latter turns gear 63, gear 62, shaft 59, gears 58 and 57, shaft 56, gears 55 and 53, shaft 51, gears 48 and 47 and accordingly the distributing plates 34.

Various changes may be resorted to within the spirit and scope of the invention. For example, one modified form is shown in Figure 10. The attachment in this figure is connected to a different construction of riding planter whose frame is shown at 70, ground wheel at 71, axle 72, and gear wheel thereon 73. A bracket 74, of appropriately different shape due to the shape of the frame 70 is employed, being bolted as at 75 to the frame 70. Shaft 56 in this instance has a bevel gear wheel 76 keyed thereto enmeshed with a bevel gear wheel 77 carried by a shaft 78 journaled in the bracket 74 and which in turn carries a bevel gear 79 enmeshed with the bevel gear 73. The construction is otherwise identical with Figure 1.

Figure 11 shows a further modified form in which the drive gearing is adapted to another construction or type of riding planter 81. A bracket 82 of different shape from the brackets 60 and 74, due to the shape of the frame of the planter 81 is employed for attachment to such frame. Shaft 56 is journaled in such frame and carries a bevel gear wheel 83, enmeshed with a bevel gear wheel 84 carried by a shaft 85 journaled on the bracket and in turn carrying a bevel gear wheel 86 enmeshed with a bevel gear wheel 87 carried by the axle 88 of ground wheel 89 of the riding planter. A clutch 90 is provided in the shaft 85 and it is engaged by a lever 91, pivoted to the bracket at 92. A spring 93, normally maintains the clutch 90 closed. Operation of the lever 91 will open such clutch. To this end lever 91 is preferably pivoted as at 94 to the main lifting lever 95 of the riding planter, such lever having lock means 96 coacting with a toothed segment 97 on the frame of planter 81.

I claim as my invention:

1. An attachment of the class described comprising a bracket, a stud carried by the bracket, a hopper secured to said stud having a seed discharge opening, a distributing plate beneath the hopper having openings to register with and receive seeds from the first mentioned opening, said bracket having an opening to receive seeds from the distributing plate, means to rotate said distributing plate including a gear journaled on said stud, gearing journaled on the bracket to drive said gear, a driving shaft for said gearing on which said bracket and gearing are mounted and movable and means to secure the bracket in adjusted position along said shaft and to the implement to which the attachment is secured for adjustment according to the width of row desired.

2. A device of the class described comprising a bracket having depending bearing arms and an upper wall, said wall having a recess, a seed discharge opening in said wall, a distributor plate journaled in said recess having openings therethrough adapted to register with the first mentioned openings, a stud on said bracket having a screw rising therefrom, a hopper having a base wall above which said screw projects, a nut engaging said screw to secure the hopper in place, a spider constituting a handle for said nut, the bottom wall being open so that seed may pass from the hopper to the opening of the distributor plate, a gear to drive said distributor plate journaled on said stud, a gear in mesh with the first mentioned gear having a sleeve journaled in one of said bearings, a shaft extending through the last mentioned gear to drive the same and along which the bracket is adjustable, and a bushing for said shaft journaled in the bearing.

3. A device of the class described having a frame, means to attach the frame to a planter, seed discharging hoppers on said frame, a shaft to operate said seed discharging hoppers, a shaft rising from the first mentioned shaft and geared to the first mentioned shaft, a bracket attachable to the frame, and gearing carried by said bracket in driving relation to the second mentioned shaft adapted for connection to the axle of the planter, said drive means including a clutch.

CHARLES BLASCHKE.